United States Patent [19]

Smith, 2nd

[11] 3,998,410
[45] Dec. 21, 1976

[54] APPARATUS AND METHOD FOR DETECTING A DIGITAL CHANGE IN DATA

[75] Inventor: Frank Patterson Smith, 2nd, Dresher, Pa.

[73] Assignee: Narco Scientific Industries, Inc., Fort Washington, Pa.

[22] Filed: Oct. 28, 1975

[21] Appl. No.: 625,880

[52] U.S. Cl. .......................... 244/183; 235/151.32; 343/12 R; 343/112 D

[51] Int. Cl.² ..................... G06F 15/50; G06G 7/78

[58] Field of Search ...... 33/232; 235/61 NV, 61 V, 235/61.5 DF, 92 EC, 150.2, 150.22, 152, 151.32, 159, 174; 244/183, 187; 340/24, 258 A, 282; 343/10, 12 K, 112 D

[56] References Cited
UNITED STATES PATENTS

| | | |
|---|---|---|
| 3,649,818 | 3/1972 | Sylvander et al. .......... 235/150.2 X |
| 3,872,288 | 3/1975 | Sampey ........................ 235/151.32 |
| 3,908,116 | 9/1975 | Bjornsen ................... 235/151.32 X |

Primary Examiner—Stephen G. Kunin
Attorney, Agent, or Firm—Paul & Paul

[57] ABSTRACT

In a DME system, the least significant decade of the present aircraft to ground station distance is maintained encoded in a memory, and an up-down counter maintains a variable count. The complement of the present distance is compared with the present count, and when a difference is detected, a logical pulse increments the counter and also indicates passage of the aircraft through another distance interval. The sense of the difference between the present distance and the count also is monitored, responsive to which the direction of the count is controlled.

12 Claims, 1 Drawing Figure

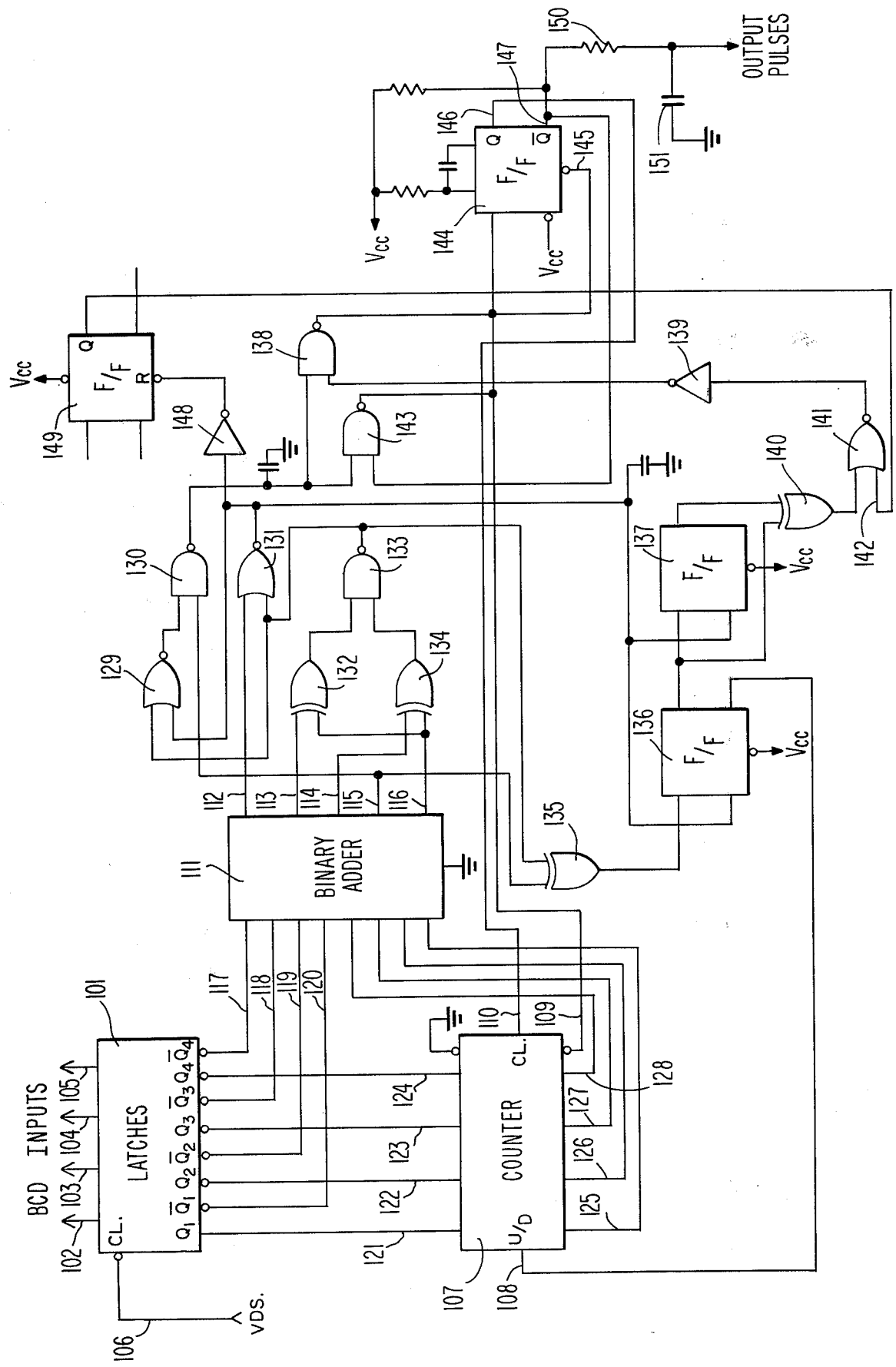

APPARATUS AND METHOD FOR DETECTING A DIGITAL CHANGE IN DATA

BACKGROUND OF THE INVENTION

This invention relates to aircraft distance measuring equipment (DME), and more particularly to improvements in digital DME systems.

Conventionally, DME operation involves the transmission of a radio signal of specified character from an aircraft to a ground station. After specified delays and under known constraints at the ground station, a reply signal is radioed back to the aircraft. Once the return signal is identified, and known time delays are accounted for, the duration between transmission and reception is decoded to yield distance from the ground station to the aircraft.

Due to the nature of the data utilized to compute aircraft to ground station distance, other parameters of the flight of the aircraft also may be developed. DME systems are available which also provide the pilot with an indication of aircraft ground speed and of the time which will be required for the aircraft, travelling at the present speed, to reach the ground station. In U.S. patent application Ser. No. 571,845 of R. L. Powell, et al., filed Apr. 28, 1975 and assigned to the assignee hereof, there is described a method and apparatus for developing a ground speed indication for digital DME systems. In that system, a voltage controlled oscillator provides a pulse signal which, when frequency scaled, is representative of aircraft velocity. Pulses representative of passage of the aircraft over distance intervals are coupled to one input of a comparator-integrator, and the VCO output pulses are further divided and coupled to the other input terminal of the comparator-integrator. The integration voltage controls the VCO.

For the ground speed calculation of the referenced copending application, and for other DME system functions as well, operation is dependent on provision of signals representing passage of the aircraft over distance intervals. Conventional DME systems operate to a degree of precision of tenths of nautical miles, so it is useful to provide signals representing passage of the aircraft through such intervals. For reasons inherent in the design of conventional DME systems, however, provision of totally accurate distance passage signals is neither simple nor straight forward.

For example, each ground station simultaneously serves many aircraft, and due to operational constraints, may be forced at times to serve some aircraft and ignore others. Also, atmospheric or the like disorders may prevent a ground station response from being properly decoded at an aircraft. Ground station and aircraft antenna "shadow periods" may also impede DME ranging. Hence, unless these potential difficulties are accounted for, the DME may fail to discriminate significant changes of aircraft to ground station distance.

It is accordingly a primary object of the present invention to provide distance decoding logic whereby distance change is accurately noted, even though considerable time may lapse between successive accurate DME ranging calculations.

It is a further object to provide ancillary logic whereby reversals of aircraft direction are accurately noted. That is, noise conditions or the like may temporarily appear to be distance reversals, and it is an object of the present invention to discriminate such "false reversals" from true aircraft directional change, and to maintain the distance decoding appropriately.

Further, it will be understood that satisfaction of the above objects in DME systems will also provide a apparatus which finds utility in other systems based on similar data processing capability. That is, many systems require continuous monitoring of coded data change, and advantages accrue in such systems if the degree of change which has occurred may be effectively determined in a manner as set forth herein for DME systems. It is accordingly another object of the present invention to provide data change detection apparatus and methods which are applicable to a wide variety of systems which have data processing requirements similar to those of DME systems.

SUMMARY OF THE INVENTION

The present invention involves logical apparatus and methods whereby pulses are produced for each distance increment through which the aircraft passes, even though the true aircraft to ground station distance only assumes a proper state intermittently. More specifically, the least significant decade of the encoded version of present aircraft to ground station distance is maintained in storage, and a logical counting signal is also maintained for comparison therewith. When the present distance is noted to change, the complete extent of such change is evaluated, and the counting signal is incremented a number of times to equate it once more with the present distance. Each such increment represents a predetermined distance interval, and passage therethrough is noted by production of a signal pulse. The present invention also accounts for changes in distance by noting the sense of the differential between the present distance and the present count. By monitoring two successive differentials at the time of a sign change, direction reversals are discriminated from data backup errors.

DESCRIPTION OF THE DRAWING

The attached FIGURE sets forth a detailed schematic logic diagram of a preferred embodiment of the present invention.

DETAILED DESCRIPTION

In the embodiment shown, logic is designed to monitor distance and distance changes in terms of tenths of miles. That is, in accordance with conventional practice, DME systems calculate distance to station to a 1/10th or 2/10th mile sensitivity, and it is the fractional mile portion which is utilized in accordance with the principles of the present invention to determine distance changes. For the preferred embodiment shown, 1/10th mile distance changes are to be recognized and decoded. Hence, the BCD encoded tenth mile component of the distance is coupled to input terminals 102 through 105 of latches 101. The binary data at terminals 102 through 105 is strobed into the latches upon receipt of each valid distance pulse (VDS) at 106. For example, whether the distance to station is 1.4 miles or 139.4 miles, the 0.4 component, encoded as 0100 in BDC, is strobed into the latches 101.

The BCD quantity in the latches is coupled to the preset inputs of a counter 107 by means of output lines 121 through 124, and the complement of the BCD data in the latches 101 is coupled via lines 117 through 120 to a first four inputs of a binary adder 111. The counter 107 stores a variable count which may be compared to the BCD information in the latches 101, and which therefore serves as a reference against which it may be determined whether the aircraft distance to station is changing, to a 0.1 mile degree of precision. As set forth hereinafter, the quantity at 121 through 124 is entered into the counter 107 only upon receipt of a pulse at the preset control terminal 109. The present count in the counter is coupled at terminals 125 through 128 to a second set of inputs of the binary adder 111, such that the complements of the four BCD bits in the latches 101 are respectively added with the four BCD bits in the counter, and the binary sum is represented at output terminals 112 through 116 of the adder 111. In particular, terminal 112 represents the least significant bit sum, or "unit's place"; terminal 113 represents the next significant bit sum, or "two's place"; output terminal 114 represents the next most significant bit sum, or "four's place "; and terminal 115 represents the most significant bit sum, or "eights place." Terminal 116 represents the carry bit from the 4 bit summation.

The latches 101 advantageously are embodied as D-type flip flops having respective output states at 117 through 124 depending on the binary information presented at input terminals 102 through 105 when a clock pulse is received at 106. The counter 107 is embodied as any of the several up/down counters currently available commercially, including those utilizing the designation "74190." As such, the count is incremented by one upon receipt of each clock pulse at 110, and the direction of the counting is established by the logical state of control terminal 108. Whenever an energizing pulse is received at preset control terminal 109, the input data at preset terminals 121 through 124 is latched into, and supercedes the present count.

The latches 101, counter 107, and adder 111 function together to determine whenever tenth mile changes occur, and depending on the extent of disparity between the data in the latches 101 and that in the counter 107, a number of tenth mile increments may be noted. Essentially, the data in the latches 101 represents the present tenth mile distance, and that in the counter contains the tenth mile distance at the last previous update. Hence, the binary addition of the BCD complement from the latches 101 with the present distance from the counter 107 produces a four bit plus carry binary addition which indicates the degree of distance passage of the aircraft since the last previous valid update. So long as the present and last previous update tenth mile distances are equal, output terminals 112 through 115 of adder 111 will all be logical 1s, and the carry output 116 will be a logical 0. On the other hand, any other output state at terminals 112 through 116 of adder 111 will indicate a passage of the aircraft through a number of tenth mile increments, and are utilized as follows.

Essentially, the apparatus shown in the drawing functions to determine whether the latch and counter quantities are unequal, whether they differ by plus or minus one tenth mile, and whether they represent a change of direction of the aircraft. More particularly, since the logic is presented at 102 through 105 only to a tenth of a mile precision, two interpretations are available for each output code from the adder 111. For example, a change from 0.8 to 0.2 may be interpreted as an increase of distance to station of 0.4 miles, or a decrease of 0.6 miles. In order to avoid this ambiguity, certain logical rules are established. First, if the BCD tenth mile distances in the latches 101 and the counter 107 are equal, no distance change is represented. If the difference shown is not 0.1 (i.e., either a turn around or an erroneous data backup caused by system jitter), the same distance direction is presumed, and that number is utilized. Finally, a potential turn around, (i.e., a difference of 0.1 with a sense change) is monitored by considering the next successive change, and allowing its direction sense to determine whether the previous change truly represented a turn around (i.e., it is in accord with the sign of the 0.1 change), or merely was a data error (i.e., it is opposite the 0.1 change).

In the drawing, NOR gates 129 and 131, NAND gates 130 and 133, and exclusive OR gates 132, 134, and 135 operate in response to the output data from adder 111, and thereby evaluate data from the adder 111 in accordance with the foregoing logical rules. In particular, the output of NAND gate 130 is a logical 0 whenever the latch and counter data are equal, and otherwise becomes a logical 1. The output of NAND gate 130 in turn is coupled to NAND gate 143, which under the control of the $\overline{Q}$ output 147 of a one shot flip flop 144 controls the set input of the same flip flop. Thus, receipt of an "unequal" command from NAND gate 130 fires the one shot 144 via NAND gate 143, which also is connected in feedback relation from the $\overline{Q}$ output 147 of the one shot 144, and thereby cuts off the "unequal" command after the one shot has fired. The Q output 146 of the one shot 144 pulses the clock input 110 of the counter 107, and thereby increments the count at 125 through 128. If the new result at the outputs 112 through 116 of the adder 111 again produces an "unequal" signal at NAND gate 130, the process is repeated, and so on until the counter is incremented to a status equal to that in the latches 101, whereupon the output of the binary adder 111 at 112 through 116 becomes 11110. Each output pulse from terminal 147 of the one shot 144 constitutes an output signal for the embodiment shown, and is used elsewhere in the DME to indicate passage of the aircraft through another one tenth mile increment.

As set forth hereinbefore, the "unequal" signal may not have its prescribed effect if the change noted at the adder 111 is 0.1 miles. At such time, it must first be determined whether or not a directional change is occuring. Each time the data in the latches 101 differs from that in the counter 107 by 0.1 miles, the output of NOR gate 131 is energized, constituting a "shift" command. At such time, the present "direction" of the aircraft is also available at the output of exclusive OR gate 135.

The "shift" and "direction" signals are coupled to a memory comprising flip flops 136 and 137, with associated gates 140 and 141, which distinguish valid turn arounds from erroneous data backups, and control the counter 107 and the one shot 144 on that basis. In particular, the direction signal from exclusive OR gate 135 is coupled to the D input of flip flop 136, and the shift signal from NOR gate 131 is coupled to the C input of both of flip flops 136 and 137. The Q output of flip flop 136 is coupled to the D input of flip flop 137, and the $\overline{Q}$ output of flip flop 136 controls the up/down control terminal 108 of the counter 107. The Q outputs of flip flops 136 and 137 are both coupled to an exclusive OR gate 140, which through NOR gate 141 and an inverter 139 cooperate with the "not equal" signal at NAND gate 138 to reset the one shot 144 at 145 whenever a data backup is indicated, and also to preset the counter 107 via present control terminal 109.

It will be appreciated that due to the interconnection shown for the flip flops 136 and 137, there results a determination whether the prevailing direction in the counter 107 and at exclusive OR gate 135 is the same as the memory output from exclusive OR gate 140. If different, the new direction is put into the memory comprising flip flops 136 and 137, the one shot 144 is immediately stopped via NAND gate 138, and the counter 107 is preset to the BCD distance in the latches 101 via terminals 121 through 124.

The APPENDIX hereof shows a truth table indicating the operation of select ones of the foregoing logical operations.

The net effect is that a tenth mile backup of data does not fire the one shot for a significant period, and the corresponding forward 1/10th mile step after a backup is also cancelled. On the other hand, two consecutive 1/10th mile changes in the opposite direction to one another are interpreted as a change in direction of the aircraft, and further distance measuring is sensed on that basis.

One other feature involved in the logic shown is provision at input terminal 142 of NOR gate 141 to inhibit firing of the one shot 144, and the consequent clocking and incrementing of the counter 107 upon a desired control situation, such as signal loss, in the DME unit. This "no data/no compare" function is generated at a flip flop 149, which is responsive to other control circuitry in the DME, not shown, and which indicates loss of valid data at 102 through 105. Hence, output pulses at 147 are inhibited. Further, the flip flop 149 may itself be connected in the ground speed apparatus, thereby also inhibiting that DME subsystem from erroneous operation.

In summary, the foregoing description and the logic shown in the accompanying drawing sets forth apparatus for noting successive 1/10th mile distance passage increments, even though several tenth mile passages may have been made since the prior valid distance indication. Assuming conventional binary coded decimal (BCD) designation of the tenth mile data in the latches 101 and the counter 107, the following table describes logical states of the adder 111 and gates 130, 131, 133, and 135.

It is understood that the foregoing is illustrative of the principles of the present invention, but many alternative embodiments will occur to those of ordinary skill in the art. For example, different code allocations and/or different logic configurations may be utilized which nevertheless fall within the scope of the present invention.

| INPUT | | | INTERMEDIATE POINTS U535 | | | | OUTPUT COMMANDS | | |
| --- | --- | --- | --- | --- | --- | --- | --- | --- | --- |
| Input Mi. | $\Sigma_1$ 112 | $\Sigma_2$ 113 | $\Sigma_4$ 114 | $\Sigma_8$ 115 | C 116 | GATE 133 | GATE 131 (shift) | GATE 130 (not equal) | GATE 135 (direction) |
| +.9/−.1 | 0 | 1 | 1 | 0 | 0 | 0 | 1 | 1 | 0 (down) |
| +.8/−.2 | 1 | 1 | 1 | 0 | 0 | 0 | 0 | 1 | X |
| +.7/−.3 | 0 | 0 | 0 | 1 | 0 | 1 | 0 | 1 | X |
| +.6/−.4 | 1 | 0 | 0 | 1 | 0 | 1 | 0 | 1 | X |
| +.5/−.5 | 0 | 1 | 0 | 1 | 0 | 1 | 0 | 1 | X |
| +.4/−.6 | 1 | 1 | 0 | 1 | 0 | 1 | 0 | 1 | X |
| +.3/−.7 | 0 | 0 | 1 | 1 | 0 | 1 | 0 | 1 | X |
| +.2/−.8 | 1 | 0 | 1 | 1 | 0 | 1 | 0 | 1 | X |
| +.1/−.9 | 0 | 1 | 1 | 1 | 0 | 0 | 1 | 1 | 1 (up) |
| equal | 1 | 1 | 1 | 1 | 0 | 0 | 0 | 0 | X |
| +.9/−.1 | 0 | 0 | 0 | 0 | 1 | 0 | 1 | 1 | 0 (down) |
| +.8/−.2 | 1 | 0 | 0 | 0 | 1 | 0 | 0 | 1 | X |
| +.7/−.3 | 0 | 1 | 0 | 0 | 1 | 1 | 0 | 1 | X |
| +.6/−.4 | 1 | 1 | 0 | 0 | 1 | 1 | 0 | 1 | X |
| +.5/−.5 | 0 | 0 | 1 | 0 | 1 | 1 | 0 | 1 | X |
| +.4/−.6 | 1 | 0 | 1 | 0 | 1 | 1 | 0 | 1 | X |
| +.3/−.7 | 0 | 1 | 1 | 0 | 1 | 1 | 0 | 1 | X |
| +.2/−.8 | 1 | 1 | 1 | 0 | 1 | 1 | 0 | 1 | X |
| +.1/−.9 | 0 | 0 | 0 | 1 | 1 | 0 | 1 | 1 | 1 (up) |

X = don't care

I claim:

1. In a DME system, apparatus, in an aircraft communicating with a ground station, for evaluating passage of the aircraft through predetermined distance intervals comprising:
   a. means for storing an encoded representation of the present distance between the aircraft and the ground station, increments in the encoded representation corresponding to said intervals;
   b. counting means for storing a representation of prior aircraft to ground station distance, said counting means being incremented by a first control signal in a sense established by a second control signal;
   c. means for developing an encoded difference between said present and said prior distances;
   d. means, responsive to the sense of said difference, for developing said second control signal; and
   e. means, responsive to an inequality between said present and said prior distance, for generating an output pulse comprising said first control signal, each output pulse representing one of said intervals.

2. Apparatus as described in claim 1 wherein said means for developing said second control signal includes means for selectively inhibiting the generation of an output pulse in response to said encoded difference, and for replacing said prior distance in said counting means with said present distance in said means for storing.

3. Apparatus as described in claim 2 wherein said means for inhibiting is disabled when said encoded difference represents more than one of said intervals.

4. Apparatus as described in claim 3 wherein said means for inhibiting is energized when said encoded difference represents one of said intervals, but is disabled if the sense of the next subsequent encoded difference is the same as the sense of said one of said intervals.

5. Apparatus as described in claim 4 wherein said second control signal is developed upon disablement of said means for inhibiting.

6. Apparatus as described in claim 1 wherein said encoding is binary coded decimal (BCD), said encoded representation is the least significant decade of the present aircraft to ground station distance, and said means for developing an encoded difference comprises a binary adder, said adder combining respective BCD digits of said count with the BCD complement of said least significant decade, the binary sum from said adder representing said difference.

7. In a DME system having a transceiver in an aircraft communicating with a ground station, a method of evaluating passage of the aircraft through predetermined distance intervals comprising the steps of:
 a. storing an encoded representation of the present distance between the aircraft and the ground station, increments in the encoded representation corresponding to said intervals;
 b. storing a representation of prior aircraft to ground station distance, said prior representation being incremented by a first control signal in a sense established by a second control signal;
 c. developing an encoded difference between said present and said prior distances;
 d. developing said second control signal in response to the sense of said encoded difference; and
 e. generating an output pulse comprising said first control signal in response to an inequality between said present and said prior distance, each output pulse representing one of said intervals.

8. A method as described in claim 7 wherein said second named developing step includes selectively inhibiting the generation of an output pulse in response to said encoded difference, and replacing said prior distance with said present distance.

9. A method as described in claim 8 wherein said inhibiting step is superceded by said generating step when said encoded difference represents more than one of said intervals.

10. A method as described in claim 9 wherein said inhibiting step is initiated when said encoded difference represents one of said intervals, but is disabled if the sense of the next subsequent encoded difference is the same as the sense of said one of said intervals.

11. A method as described in claim 10 wherein said second control signal is developed upon disablement of said inhibiting step.

12. In a system utilizing BCD encoding, apparatus for detecting change in a stored reference quantity comprising:
 a. means for storing an encoded representation of the least significant decade of said reference quantity;
 b. counting means for storing a prior representation of said stored least significant decade representation, said counting means being incremented by a first control signal in a sense established by a second control signal;
 c. means for developing an encoded difference between said present and said prior stored decade representations;
 d. means, responsive to the sense of said difference, for developing said second control signal; and
 e. means, responsive to an inequality between said present and said prior stored decade representations, for generating an output pulse comprising said first control signal, each output pulse representing a single increment of said reference quantity.

* * * * *